Oct. 23, 1923.
G. HAMBURG
TALKING MACHINE HORN
Filed May 24, 1921
1,471,459
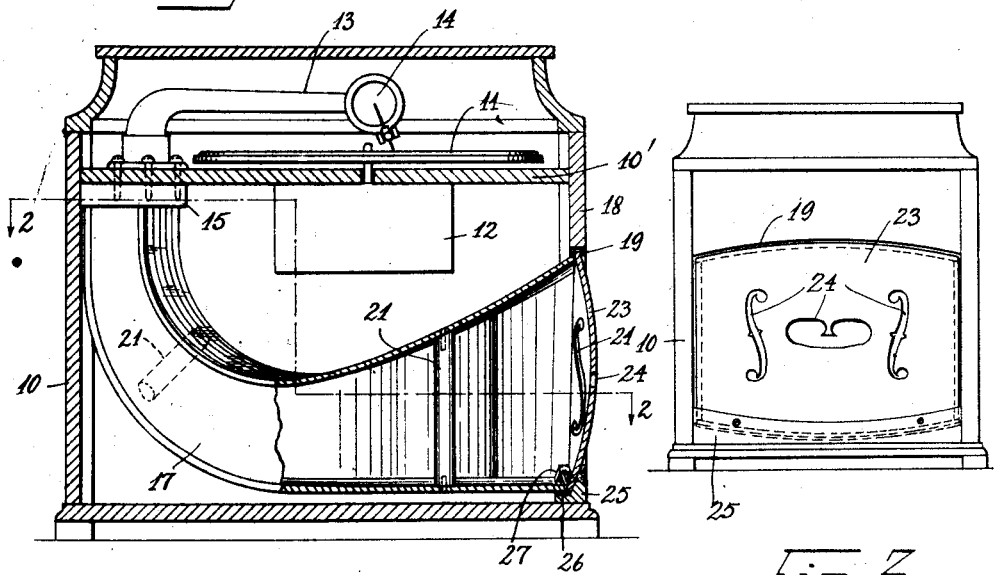
Fig. 1.
Fig. 3.
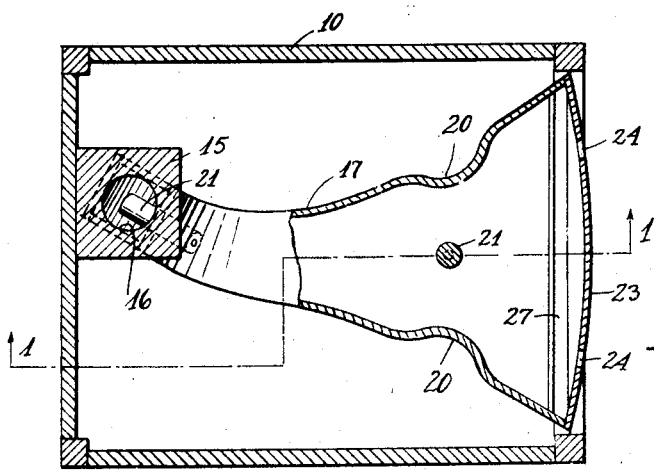
Fig. 2.
George Hamburg  INVENTOR.
BY
Richards Geier  ATTORNEYS.

Patented Oct. 23, 1923.

1,471,459

UNITED STATES PATENT OFFICE.

GEORGE HAMBURG, OF NEW YORK, N. Y.

TALKING-MACHINE HORN.

Application filed May 24, 1921. Serial No. 472,223.

*To all whom it may concern:*

Be it known that I, GEORGE HAMBURG, a citizen of the United States, and resident of New York, in the county of New York and State of New York, have invented certain new and useful Improvements in Talking-Machine Horns, of which the following is a specification.

This invention relates generally to talking machines, having more particular reference to the construction of the horn thereof.

The invention has for an object to increase the purity and clearness of the tones or sounds emitted by the talking machine, and also to provide a horn which will deliver the sounds with increased resonance and fullness.

For further comprehension of the invention, and of the objects and advantages thereof, reference will be had to the following description and accompanying drawings, and to the appended claims in which the various novel features of the invention are more particularly set forth.

Figure 1 of the drawings is a vertical sectional view on the line 1—1 of Fig. 2 of a talking machine provided with my improved horn, the latter being shown partly in side elevation and partly in longitudinal section, on the line 1—1 of Fig. 2.

Fig. 2 is a horizontal section on the line 2—2 of Fig. 1, and

Fig. 3 is a front view of the machine.

Referring now to the drawings, the numeral 10 indicates generally the casing of a talking machine, having a top plate 10' above which is the turntable 11 driven by a motor 12. Upon the top plate 10' is swiveled the tone arm 13 having the sound box 14 on its free end. All these parts may be of usual or approved construction.

Secured to the underside of the top plate 10', in registry with the swiveled end of the tone arm 13, is a block 15 having an aperture 16 which leads from the tone arm to the horn 17.

My improved horn is secured at its inner end to the block 15 by gluing or otherwise, curving downwardly and forwardly to the front wall 18 of the casing in which is an aperture 19 with which the mouth of the horn registers. The horn 17 is preferably of substantially rectangular cross section with the bottom and sides thereof made of maple and the top of spruce.

The horn flares out gradually toward its mouth as shown, preferably having its sides bowed inwardly as at 20 a short distance from the mouth. Extending between upper and lower walls of the horn are a pair of posts 21, one of which is located between the bowed side portions 20 and the other at some distance to the rear thereof.

The inwardly bowed portions 20 and the sounding post 21 are so proportioned as to provide a restricted passageway for the sound waves at this point, it being noted that the post 21 is arranged in substantially the same transverse plane as the innermost points of the bowed portions 20. The effect thereby produced is somewhat similar to the well known Venturi effect and permits a swelling of the sound waves at a point quite near to the front of the sound horn adjacent the apertures 24. As a result of this swelling of the sound waves at the front part of the horn it will be obvious that the sounds produced by the diaphragm of the machine will not only appear to emanate from the front part of the sounding chamber or horn, but will also greatly increase the volume of the instrument. The shape of the bowed portions also tends to deflect the sound waves directly towards the apertures 24. I have discovered that the use of a soft wood such as spruce for the top of the sounding horn and a hard wood such as maple for the bottom produces exceptionally clear sweet tones, the softness of the spruce evidently toning down the harshness of the sounds and absorbing the sound waves of small amplitude which produce the familiar metallic sounds common to most phonographs while the hardness of the maple tends to produce the requisite clearness and sharpness of the tones.

By referring to the drawings it will be noted that the top and bottom of the horn are bowed or concaved outwardly adjacent the front part of the horn to cause the sound waves to be deflected in such paths that the tendency will be to direct the most of the waves towards the central part of the horn adjacent the apertures 24.

Extending across the mouth of the horn is a cover member 23 which has suitable openings such as 24 for the passage of sound, this member being preferably convexed outwardly as shown.

The front end of the horn is supported in a recessed cross member 25 extending along the bottom of the aperture, a strip of felt 26 being interposed under the horn, while a lining strip 27 is placed in the horn and extends along the meeting line of the bottom of the horn and the cover member 23.

Having thus described my invention what I claim as new and desire to protect by Letters Patent of the United States, is as follows:—

I claim:—

In a talking machine, a horn of substantially rectangular cross section having each of its sides provided with an inwardly bowed portion adjacent to and at equal distances from the front of the horn, a sounding post in transverse alignment with said inwardly bowed portions, said bowed side portions and said post forming a restricted passageway and said horn flaring forwardly and outwardly from said passageway thereby permitting a swelling of the sound waves at the front of the horn.

Signed at New York in the county of New York and State of New York this 13 day of May, A. D. 1921.

GEORGE HAMBURG.